United States Patent [19]
Andersen et al.

[11] Patent Number: 5,716,675
[45] Date of Patent: Feb. 10, 1998

[54] METHODS FOR TREATING THE SURFACE OF STARCH-BASED ARTICLES WITH GLYCERIN

[75] Inventors: Per Just Andersen; Simon K. Hodson, both of Santa Barbara, Calif.

[73] Assignee: E. Khashoggi Industries, Santa Barbara, Calif.

[21] Appl. No.: 661,221

[22] Filed: Jun. 10, 1996

Related U.S. Application Data

[63] Continuation-in-part of Ser. No. 353,543, Dec. 9, 1994, Ser. No. 327,524, Oct. 21, 1994, Ser. No. 288,667, Aug. 9, 1994, Ser. No. 152,354, Nov. 19, 1993, Pat. No. 5,508,072, Ser. No. 192,965, Feb. 7, 1994, abandoned, Ser. No. 982,383, Nov. 25, 1992, abandoned, and Ser. No. 407,037, Mar. 17, 1995, Pat. No. 5,580,624, which is a continuation of Ser. No. 982,383, said Ser. No. 353,543, Ser. No. 327,524, Ser. No. 288,667, Ser. No. 152,354, and Ser. No. 192,965, each is a continuation-in-part of Ser. No.982,383.

[51] Int. Cl.$^6$ .............................. B05D 3/02; A21D 15/08

[52] U.S. Cl. ............................................. 427/384; 427/316

[58] Field of Search ..................................... 427/414, 243, 427/384, 316; 426/138, 805, 808

[56] References Cited

U.S. PATENT DOCUMENTS

| | | |
|---|---|---|
| 3,294,547 | 12/1966 | Kooistra, Jr. . |
| 3,425,972 | 2/1969 | Nobile et al. ......................... 264/216 |
| 3,472,804 | 10/1969 | Nobile et al. ......................... 264/216 |
| 3,493,382 | 2/1970 | Ryan et al. . |
| 3,732,112 | 5/1973 | Frankenfeld et al. . |
| 3,949,145 | 4/1976 | Otey et al. . |
| 3,968,004 | 7/1976 | Coffey et al. . |
| 4,017,324 | 4/1977 | Eggers . |
| 4,043,862 | 8/1977 | Roberts . |
| 4,044,166 | 8/1977 | Koizumi . |
| 4,070,196 | 1/1978 | Kraak et al. . |
| 4,076,547 | 2/1978 | Lester et al. . |

(List continued on next page.)

FOREIGN PATENT DOCUMENTS

| | | |
|---|---|---|
| 0006390 A1 | 1/1980 | European Pat. Off. . |
| 0265745 A2 | 5/1988 | European Pat. Off. . |
| 0447797 A2 | 9/1991 | European Pat. Off. . |
| 0453980 A2 | 10/1991 | European Pat. Off. . |
| 0370913 B1 | 12/1992 | European Pat. Off. . |

(List continued on next page.)

OTHER PUBLICATIONS

Bishop, Cotton, Wool and Silk, Make Way For Soybeans, Wall Street Journal (Jan. 14, 1993).

Clark, *The Incredible, Edible Plastic*, Ag Consultant (May 1993).

Davidson et al., *Water–Soluble Resins*, New York: Reinhold Publishing Corp., Chapman & Hall, Ltd., London (1962/no month).

(List continued on next page.)

*Primary Examiner*—Diana Dudash
*Attorney, Agent, or Firm*—Workman, Nydegger & Seeley

[57] ABSTRACT

Compositions and methods for the post-production treatment of a starch-bound article to increase the flexibility of the treated article by softening or plasticizing the article through the application of a polyalcohol, preferably glycerin. The glycerin is preferably mixed with water before application to aid in penetrating the cellular matrix of the article. The glycerin acts as a plasticizer and a humectant, and it stabilizes the starch-bound matrix against warping that otherwise results when water-borne substances are applied to the surface of a starch-bound article. The glycerin treatment can be applied to a hinge to increase the resilience and durability of the hinge, generally by causing the inner hinge surface to be more collapsible, which greatly decreases the radius of bending of the outer surface of the hinge and which thereby reduces the amount of strain or elongation exerted on the outer surface of the hinge. The mixture of glycerin and water may optionally further include a water-based coating, such as polyvinyl alcohol, and/or an inorganic mineral such as kaolin.

15 Claims, 3 Drawing Sheets

U.S. PATENT DOCUMENTS

| | | |
|---|---|---|
| 4,080,213 | 3/1978 | Mori et al. . |
| 4,089,691 | 5/1978 | Cummisford et al. . |
| 4,094,077 | 6/1978 | Schrader et al. . |
| 4,124,550 | 11/1978 | Kabayashi et al. . |
| 4,133,784 | 1/1979 | Otey et al. . |
| 4,149,550 | 4/1979 | Green et al. . |
| 4,172,154 | 10/1979 | von Rymon Lipinski . |
| 4,204,337 | 5/1980 | Roos et al. . |
| 4,210,490 | 7/1980 | Taylor . |
| 4,225,247 | 9/1980 | Hodson . |
| 4,225,383 | 9/1980 | McReynolds . |
| 4,229,225 | 10/1980 | Kraszewski et al. . |
| 4,249,991 | 2/1981 | Baes et al. . |
| 4,303,690 | 12/1981 | Haas, Sr. et al. . |
| 4,306,059 | 12/1981 | Yokobayashi et al. . |
| 4,328,136 | 5/1982 | Blount . |
| 4,329,177 | 5/1982 | George . |
| 4,377,440 | 3/1983 | Gasland . |
| 4,378,271 | 3/1983 | Hargreaves et al. . |
| 4,394,930 | 7/1983 | Korpman . |
| 4,410,571 | 10/1983 | Korpman . |
| 4,438,685 | 3/1984 | Haas, Sr. et al. . |
| 4,445,970 | 5/1984 | Post et al. . |
| 4,454,268 | 6/1984 | Otey et al. . |
| 4,456,625 | 6/1984 | Durst . |
| 4,482,386 | 11/1984 | Wittwer et al. . |
| 4,508,595 | 4/1985 | Gasland . |
| 4,511,585 | 4/1985 | Durst . |
| 4,524,682 | 6/1985 | Haas, Sr. et al. . |
| 4,529,653 | 7/1985 | Hargreaves et al. . |
| 4,543,370 | 9/1985 | Porter et al. . |
| 4,545,854 | 10/1985 | Gomez et al. . |
| 4,562,218 | 12/1985 | Fornandel et al. . |
| 4,588,443 | 5/1986 | Bache . |
| 4,592,795 | 6/1986 | Bridgeford .............................. 427/414 |
| 4,595,623 | 6/1986 | Du Pont et al. . |
| 4,613,627 | 9/1986 | Sherman et al. . |
| 4,623,150 | 11/1986 | Moehlman et al. . |
| 4,624,855 | 11/1986 | Haas, Sr. et al. . |
| 4,655,840 | 4/1987 | Wittwer et al. . |
| 4,673,438 | 6/1987 | Wittwer et al. . |
| 4,710,442 | 12/1987 | Fredenucci . |
| 4,711,669 | 12/1987 | Paul et al. . |
| 4,735,811 | 4/1988 | Skarra et al. . |
| 4,749,583 | 6/1988 | Branch . |
| 4,753,710 | 6/1988 | Langley et al. . |
| 4,753,790 | 6/1988 | Silva et al. ............................ 427/2.2 |
| 4,755,494 | 7/1988 | Ruben . |
| 4,775,580 | 10/1988 | Dighton . |
| 4,781,932 | 11/1988 | Skarra et al. . |
| 4,789,244 | 12/1988 | Dunton et al. . |
| 4,814,012 | 3/1989 | Paul et al. . |
| 4,828,650 | 5/1989 | Wagle et al. . |
| 4,833,191 | 5/1989 | Bushway et al. . |
| 4,846,932 | 7/1989 | Karita et al. . |
| 4,863,655 | 9/1989 | Lacourse et al. . |
| 4,872,913 | 10/1989 | Dunton et al. . |
| 4,874,618 | 10/1989 | Seaborne et al. .................... 426/76 |
| 4,882,160 | 11/1989 | Yang et al. ............................ 424/440 |
| 4,892,590 | 1/1990 | Gill et al. . |
| 4,904,494 | 2/1990 | Spanier .................................. 426/646 |
| 4,904,495 | 2/1990 | Spanier .................................. 426/646 |
| 4,912,069 | 3/1990 | Ruben . |
| 4,919,758 | 4/1990 | Wagle et al. . |
| 4,921,250 | 5/1990 | Ayres . |
| 4,923,665 | 5/1990 | Andersen et al. . |
| 4,925,530 | 5/1990 | Sinclair et al. . |
| 4,927,655 | 5/1990 | Ito . |
| 4,927,656 | 5/1990 | Ito . |
| 4,935,097 | 6/1990 | Tashiro et al. . |
| 4,941,922 | 7/1990 | Snyder . |
| 4,943,349 | 7/1990 | Gomez . |
| 4,944,595 | 7/1990 | Hodson . |
| 4,950,490 | 8/1990 | Ghiasi et al. . |
| 4,952,278 | 8/1990 | Gregory et al. . |
| 4,953,453 | 9/1990 | Haas, Sr. et al. . |
| 4,957,558 | 9/1990 | Ueda et al. . |
| 4,957,754 | 9/1990 | Munk et al. . |
| 4,963,603 | 10/1990 | Felegi, Jr. et al. . |
| 4,979,992 | 12/1990 | Bache . |
| 5,011,679 | 4/1991 | Spanier et al. ........................ 427/389 |
| 5,035,930 | 7/1991 | Lacourse et al. . |
| 5,039,003 | 8/1991 | Gordon et al. . |
| 5,039,378 | 8/1991 | Pommier et al. . |
| 5,043,196 | 8/1991 | Lacourse et al. . |
| 5,059,642 | 10/1991 | Jane et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,087,475 | 2/1992 | Bazin et al. .............................. 427/4 |
| 5,095,054 | 3/1992 | Lay et al. . |
| 5,104,487 | 4/1992 | Taggart et al. . |
| 5,104,669 | 4/1992 | Wolke et al. . |
| 5,106,648 | 4/1992 | Williams ................................. 427/4 |
| 5,106,880 | 4/1992 | Miller et al. . |
| 5,106,890 | 4/1992 | Maruhashi et al. ..................... 524/47 |
| 5,108,677 | 4/1992 | Ayres . |
| 5,108,807 | 4/1992 | Tucker . |
| 5,110,413 | 5/1992 | Steer . |
| 5,122,231 | 6/1992 | Anderson . |
| 5,124,161 | 6/1992 | van Lengerich et al. . |
| 5,126,013 | 6/1992 | Wiker et al. . |
| 5,126,014 | 6/1992 | Chung . |
| 5,134,179 | 7/1992 | Felegi, Jr. et al. . |
| 5,153,037 | 10/1992 | Altieri . |
| 5,160,368 | 11/1992 | Begovich . |
| 5,162,126 | 11/1992 | Thörner et al. . |
| 5,178,730 | 1/1993 | Bixler et al. . |
| 5,185,382 | 2/1993 | Neumann et al. . |
| 5,186,990 | 2/1993 | Starcevich . |
| 5,194,206 | 3/1993 | Koch et al. . |
| 5,201,403 | 4/1993 | Haas, Sr. et al. . |
| 5,206,087 | 4/1993 | Tokiwa et al. . |
| 5,208,267 | 5/1993 | Neumann et al. . |
| 5,209,776 | 5/1993 | Bass et al. . |
| 5,221,435 | 6/1993 | Smith, Jr. . |
| 5,224,595 | 7/1993 | Sugimoto et al. . |
| 5,234,978 | 8/1993 | Delrue et al. . |
| 5,240,561 | 8/1993 | Kaliski . |
| 5,248,702 | 9/1993 | Neumann et al. . |
| 5,252,271 | 10/1993 | Jeffs . |
| 5,256,711 | 10/1993 | Tokiwa et al. . |
| 5,258,430 | 11/1993 | Bastioli et al. . |
| 5,262,458 | 11/1993 | Bastioli et al. . |
| 5,264,030 | 11/1993 | Tanabe et al. . |
| 5,264,080 | 11/1993 | Shaw et al. . |
| 5,266,368 | 11/1993 | Miller . |
| 5,268,187 | 12/1993 | Quinlan . |
| 5,269,845 | 12/1993 | Grunau et al. . |
| 5,272,181 | 12/1993 | Boehmer et al. . |
| 5,273,167 | 12/1993 | Haas et al. . |
| 5,273,821 | 12/1993 | Olson et al. . |
| 5,275,774 | 1/1994 | Bahr et al. . |
| 5,277,764 | 1/1994 | Johansson et al. . |
| 5,278,194 | 1/1994 | Tickner et al. . |
| 5,279,658 | 1/1994 | Aung . |
| 5,280,055 | 1/1994 | Tomka . |
| 5,284,672 | 2/1994 | Ito . |
| 5,288,318 | 2/1994 | Mayer et al. . |
| 5,288,765 | 2/1994 | Bastioli et al. . |
| 5,290,350 | 3/1994 | Besnard et al. . |

| | | |
|---|---|---|
| 5,292,362 | 3/1994 | Bass et al. . |
| 5,296,180 | 3/1994 | Hayes et al. . |
| 5,296,526 | 3/1994 | Delrue et al. . |
| 5,298,273 | 3/1994 | Ito . |
| 5,300,333 | 4/1994 | Wilkerson et al. . |
| 5,308,879 | 5/1994 | Akamatu et al. . |
| 5,314,754 | 5/1994 | Knight . |
| 5,317,037 | 5/1994 | Golden et al. . |
| 5,317,119 | 5/1994 | Ayres . |
| 5,320,669 | 6/1994 | Lim et al. . |
| 5,324,351 | 6/1994 | Oshlack et al. . |
| 5,346,541 | 9/1994 | Goldman et al. . |
| 5,352,709 | 10/1994 | Tarrant et al. . |
| 5,356,467 | 10/1994 | Oshlack et al. . |
| 5,360,473 | 11/1994 | Fleche et al. . |
| 5,360,586 | 11/1994 | Wyatt et al. . |
| 5,360,828 | 11/1994 | Morrison . |
| 5,360,844 | 11/1994 | Delrue et al. . |
| 5,362,312 | 11/1994 | Skaggs et al. . |
| 5,362,776 | 11/1994 | Barenburg et al. . |
| 5,362,777 | 11/1994 | Tomka . |
| 5,367,067 | 11/1994 | Frische et al. . |
| 5,372,877 | 12/1994 | Kannankeril . |
| 5,376,320 | 12/1994 | Tiefenbacher et al. . |
| 5,378,418 | 1/1995 | Berger et al. . |
| 5,382,285 | 1/1995 | Morrison . |
| 5,382,440 | 1/1995 | Sullivan ................................. 426/138 |
| 5,382,611 | 1/1995 | Stepto et al. . |
| 5,389,322 | 2/1995 | Kim et al. . |
| 5,393,333 | 2/1995 | Trouve . |
| 5,393,804 | 2/1995 | George et al. . |
| 5,395,438 | 3/1995 | Baig et al. . |
| 5,397,834 | 3/1995 | Jane et al. . |
| 5,405,437 | 4/1995 | Leake et al. . |
| 5,405,564 | 4/1995 | Stepto et al. . |
| 5,411,639 | 5/1995 | Kurrie . |
| 5,415,827 | 5/1995 | Tomka et al. . |
| 5,419,962 | 5/1995 | Robertson et al. . |
| 5,427,614 | 6/1995 | Wittwer et al. . |
| 5,428,150 | 6/1995 | De Bock et al. . |
| 5,432,000 | 7/1995 | Young, Sr. et al. . |
| 5,436,078 | 7/1995 | Buhler et al. . |
| 5,447,604 | 9/1995 | Johansson et al. . |
| 5,454,863 | 10/1995 | Foran et al. . |
| 5,456,933 | 10/1995 | Lee . |
| 5,462,980 | 10/1995 | Bastioli et al. . |
| 5,466,493 | 11/1995 | Mefford et al. . |
| 5,470,382 | 11/1995 | Andou . |
| 5,474,856 | 12/1995 | Tamagawa et al. . |
| 5,476,621 | 12/1995 | Kustner . |
| 5,480,923 | 1/1996 | Schmid et al. . |
| 5,487,813 | 1/1996 | Vinson et al. . |
| 5,494,509 | 2/1996 | Kruythoff et al. . |
| 5,496,440 | 3/1996 | Carre et al. . |
| 5,498,645 | 3/1996 | Mariano et al. ................. 523/218 |
| 5,500,089 | 3/1996 | Huang et al. . |
| 5,501,771 | 3/1996 | Bourson . |
| 5,501,774 | 3/1996 | Burke . |
| 5,506,277 | 4/1996 | Griebach, III . |
| 5,512,090 | 4/1996 | Franke . |
| 5,512,135 | 4/1996 | Carre et al. . |
| 5,512,378 | 4/1996 | Bastioli . |
| 5,512,617 | 4/1996 | Ritter et al. ...................... 264/349 |
| 5,523,293 | 6/1996 | Jane et al. . |
| 5,576,049 | 11/1996 | Haas et al. ...................... 427/230 |

FOREIGN PATENT DOCUMENTS

| | | |
|---|---|---|
| 0546956 A2 | 6/1993 | European Pat. Off. . |
| 0551954 A2 | 7/1993 | European Pat. Off. . |
| 0556774 A2 | 8/1993 | European Pat. Off. . |
| 0405146 B1 | 2/1994 | European Pat. Off. . |
| 0304401 B1 | 3/1994 | European Pat. Off. . |
| 0271853 B2 | 7/1994 | European Pat. Off. . |
| 0608031 A1 | 7/1994 | European Pat. Off. . |
| 0609983 A2 | 8/1994 | European Pat. Off. . |
| 0118240 B1 | 7/1995 | European Pat. Off. . |
| 1278195 | 10/1961 | France . |
| 2642731 | 7/1990 | France . |
| 3346970 | 7/1985 | Germany . |
| 3420195 A1 | 12/1985 | Germany . |
| 4008862 C1 | 4/1991 | Germany . |
| 51-73143 | 6/1976 | Japan . |
| 60-35052 | 2/1985 | Japan . |
| 60-235624 | 11/1985 | Japan . |
| 63-22636 | 1/1988 | Japan . |
| 5-105815 | 4/1993 | Japan . |
| 5-171049 | 7/1993 | Japan . |
| 5-246417 | 9/1993 | Japan . |
| 5-230401 | 12/1993 | Japan . |
| 4-185468 | 2/1994 | Japan . |
| 60-32386 | 2/1994 | Japan . |
| 6-135487 | 5/1994 | Japan . |
| 6-192577 | 7/1994 | Japan . |
| 9100590 | 11/1992 | Netherlands . |
| 1584387 | 2/1981 | United Kingdom . |
| 2050459 | 6/1983 | United Kingdom . |
| 2208651 | 4/1989 | United Kingdom . |
| 2214516 | 9/1989 | United Kingdom . |
| WO 87/00828 | 2/1987 | WIPO . |
| WO 89/02225 | 3/1989 | WIPO . |
| WO 90/10671 | 9/1990 | WIPO . |
| WO 91/12186 | 8/1991 | WIPO . |
| WO 92/04408 | 3/1992 | WIPO . |
| WO 93/01242 | 1/1993 | WIPO . |
| WO 94/03543 | 2/1994 | WIPO . |
| WO 94/18384 | 8/1994 | WIPO . |
| WO 94/18388 | 8/1994 | WIPO . |

OTHER PUBLICATIONS

Dow Plastics *Thermoforming Process Guide* (no date).

Freeman Industries, Inc., *Zein In The Food Industry* (no date).

Greminger, Jr. and Krumel, *Alkyl and and Hydroxyalkylalkylcellulose*, Dow Chemical U.S.A., Midland Oregon. Chapter 3, pp. 1–25. (No date).

Iowa State University, *Crop Utilization Research/Crop Products Pilot Plant*, Utilization Center for Agriculturae Products, Ames, Iowa. (no date).

Lucht, Golf Tees Out of Corn, Boards From Beans, Iowa Farmer Today, NW Edition (Jan. 16, 1993).

Lucht, Product Research Aimed At Propping Up Crop Prices, Iowa Farmer Today, NW Edition (Jan. 16, 1993).

McGeary, Mechanical Packing of Spherical Particles, Journal of the American Ceramic Society, Vol. 44, No. 10 (Oct. 1961).

Osbaeck and Johansen, *Particle Size Distribution and Rate of Strength Development*, Paper for 89th Annual Meeting of the American Ceramic Society, Inc., Pittsburgh, PA (Apr. 26–30, 1987).

Patankar and Mandal, The Packing of Some Non–Spherical Solid Particles, Trans J. Brit. Ceram. Soc., vol. 79, pp. 59–66 (1980). (no month).

Ridway and Tarbuck, *Particulate Mixture Bulk Densities*, Chemical and Process Engineering (Feb. 1968).

G.C. Robinson, *Extrusion Defects*, pp. 391–407, (no date).

Sequa Chemicals, Inc., Technical Data, Sunrez®700 Series Insolubilizers Coating Additive.

Staley Starch and Specialty Products Group, Technical Data, Sta–Lok®400 Cationic Potato Starch. (no date).

Stovall, De Larrand, and Buil, Linear Packing Density Model of Grain Mixtures, Powder Technology, 48 1–12 (1986). (no month).

Swientek, Formidable Films, Prepared Foods (Sep. 1993).

United Soybean Board, *New Uses For Soybeans/The Best Is Yet To Be.* 1993, no month.

Vrana, Khashoggi Kin Reported Planning Private Placement of Shares in New Container Firm (Mar. 28, 1993).

Weinrich, German Comes Up With Recycled Product to Replace Foam Chips. (no date).

Westman and Hugile, *The Packing of Particles* (1930) pp. 767–779 (no month).

Zeneca, *BIOPOL, Nature's Plastic–Born from Nature, Back to Nature* (1993). (no month).

Zinland, New EcoPLA Plastic Stretches Corn Use, Iowa Farmer Today, NW Edition (Apr. 2, 1994).

*An Inventive End To A Daily Grind: Do In The Dishes.* (no date).

*Biotec Product Literature.* (no date).

ISU Researcher Foams At New Breakthrough, Times–Republican (Jul. 16, 1994).

*Plastic–Forming Processes.* pp. 355–361. (no date).

*Starch Foam Dishes at Burger King's,* Biomat 32—Production Unit for Natural Packaging. (no date).

METHODS FOR TREATING THE SURFACE OF STARCH-BASED ARTICLES WITH GLYCERIN

BACKGROUND OF THE INVENTION

1. The Field of the Invention

The present invention relates to compositions and methods for improving the properties of starch-bound articles by treating the surfaces of such articles with glycerin. More particularly, the invention relates to the treatment of the surface of starch-bound articles with glycerin or glycerin-based mixtures in order to improve the flexibility of, stabilize the dimensional integrity of, and regulate the moisture within starch-bound articles.

2. Related Applications

This application is a continuation-in-part of copending U.S. application Ser. No. 08/353,543, entitled "Articles Having a Starch-Bound Cellular Matrix Reinforced with Uniformly Dispersed Fibers," and filed Dec. 9, 1994, in the names of Per Just Andersen, Ph.D. and Simon K. Hodson; and also a continuation-in-part of copending U.S. application Ser. No. 08/327,524, entitled "Compositions and Methods for Manufacturing Fiber-Reinforced, Starch-Bound Articles Having a Foamed Cellular Matrix," and filed Oct. 21, 1994, in the names of Per Just Andersen, Ph.D. and Simon K. Hodson; and also a continuation-in-part of copending U.S. application Ser. No. 08/288,667, entitled "Methods and Systems for Manufacturing Containers and Other Articles Having an Inorganically Filled, Starch-Bound Cellular Matrix," and filed Aug. 9, 1994, in the names of Per Just Andersen, Ph.D. and Simon K. Hodson; and also a continuation-in-part of copending U.S. application Ser. No. 08/152,354, now U.S. Pat. No. 5,508,072, entitled "Sheets Having a Highly Inorganically Filled Organic Polymer Matrix," and filed Nov. 19, 1993, in the names of Per Just Andersen, Ph.D. and Simon K. Hodson; and also a continuation-in-part of copending U.S. application Ser. No. 08/192,965, abandoned, entitled "Hinges for Highly Inorganically Filled Composite Materials," and filed Feb. 7, 1994, in the names of Per Just Andersen, Ph.D. and Simon K. Hodson. This and each of the foregoing applications, is also continuation-in-part of copending U.S. patent application Ser. No. 07/982,383, now abandoned, entitled "Food and Beverage Containers Made from Inorganic Aggregates and Polysaccharide, Protein, or Synthetic Organic Binders, and the Methods of Manufacturing Such Containers," and filed Nov. 25, 1992, in the names of Per Just Andersen, Ph.D. and Simon K. Hodson (now abandoned). This application is also a continuation-in-part of copending U.S. application Ser. No. 08/407,037, now U.S. Pat. No. 5,580,624, entitled "Food and Beverage Containers Made from Inorganic Aggregates and Polysaccharide, Protein, or Synthetic Organic Binders, and the Methods of Manufacturing Such Containers," and filed Mar. 17, 1995, which is a file-wrapper-continuation of U.S. patent application Ser. No. 07/982,383, identified hereinabove. For purposes of disclosure of the present invention, each of the foregoing applications is incorporated herein by specific reference.

3. The Relevant Technology

A. Conventional Materials.

Materials such as paper, paperboard, plastic, polystyrene, glass, and even metals are presently used in enormous quantity in the manufacture of articles such as containers, separators, dividers, lids, tops, cans, and other packaging materials used to protect, store, package, dispense, or ship an enormous variety of liquid and solid goods. Containers and other packaging materials protect goods from environmental influences and distribution damage, particularly from gases, moisture, light, microorganisms, vermin, physical shock, crushing forces, vibration, leaking, or spilling. Packaging materials may also be imprinted with useful or promotional product information to the consumer, such as the origin of manufacture, contents, advertising, instructions, brand identification, and pricing.

Most conventionally manufactured containers or other packaging materials (including disposable containers) are made from paper, paperboard, plastic, polystyrene, glass, or metal materials. Each year, over 100 billion aluminum cans, billions of glass bottles, and thousands of tons of paper and plastic are used in storing and dispensing, e.g., soft drinks, juices, processed foods, cereals, grains, and beer. In addition, huge quantities of retail goods are sold or distributed using some sort of packaging material. In the United States alone, approximately 5.5 million tons of paper made primarily from tree-derived wood pulp are consumed each year solely in the production of packaging materials. This vast consumption represents only about 15% of the total annual domestic paper production.

Recently, consciousness-raising organizations have led a debate as to which of the conventional materials used to make such containers and other articles (e.g., paper, paperboard, plastic, polystyrene, glass, or metal) is most damaging to the environment, or which is more environmentally "correct." The debate often misses the point that each of these materials has its own unique environmental weaknesses. One faction will frequently tout a particular material as being superior to another when viewed in light of a particular environmental problem, while unknowingly (or even knowingly) ignoring different, often larger, problems associated with the supposedly "environmentally friendly" material. In reality, the debate should not be directed to which of these materials is more or less harmful to the environment, but rather toward asking: Can we discover or develop an alternative material which will solve most, if not all, of the various environmental problems associated with each of these presently used materials?

B. Alternative Materials.

Due to the more recent awareness of the tremendous environmental impact of using paper, paperboard, plastic, polystyrene, glass, and metals for a variety of single-use, mainly disposable, articles such as containers and other packaging materials (not to mention the ever mounting political pressures), there has been an acute need (long since recognized by those skilled in the art) to find environmentally superior or improved substitute materials.

Attempts have been made to make articles from organic materials such as starch, which is a natural, plentiful, and renewable resource. For example, articles have been made from a mixture of starch, water, and a mold-releasing agent. The starch-containing mixture is usually baked between heated molds for a period of 2–3 minutes or more until the starch gelates, foams, and hardens by nearly complete drying of the molded starch-based mixture in the desired shape of the article. Such articles have a relatively low density and are generally biodegradable.

However, the manufacture of starch-based articles, as well as the articles themselves, are plagued with a number of drawbacks. Such starch-based articles are very fragile and brittle (i.e. they have inadequately low fracture energy and flexural strength, both of which are essential qualities for most packaging materials). Dried starch-based articles tend to fracture when subjected to either tension or compression, which typically occurs during normal use of an article, such as by the act of opening, gripping, or folding the article. Accordingly, such fragile and brittle starch-based articles presently have limited use as packaging materials.

Newly demolded starch-based articles are generally very brittle due to the necessity of driving off substantially all of the free water from the articles to avoid deformation or fracture resulting from expansion of any remaining water within the freshly molded article. Before drying, the starch-based cellular matrix of the articles is very soft and pliable and unable to withstand the internal pressures persisting within the cellular matrix caused by the vaporizing free water within an under dried article. Of course, over drying the articles has its drawbacks as well, such as carmelization of the starch binder, fracture due to shrinkage, and destruction of the binding capability of the starch material. Some of the opposing concerns of under drying and over drying have been addressed by the inventors in copending application Ser. No. 08/353,543, referenced above.

In order to increase the flexibility and toughness and reduce the brittleness of starch-based articles, some have attempted to "condition" the newly demolded articles by exposing them to elevated humidity and temperature for prolonged periods of time in order to reintroduce moisture into the starch-based cellular matrix. The conditioning step increases the production time and requires significant capital investment, both of which significantly increase the cost of manufacturing starch-based articles. Even so, the improvement in properties due to conditioning are only temporary, since the article can dry out in low relative humidity conditions and have increased brittleness. In addition, over conditioning the article can cause warping or dimensional instability due to over softening of the starch-based cellular matrix.

Some have attempted to add humectants and plasticizers to the starch-based compositions prior to molding in order to decrease the brittleness and increase the toughness of the resulting starch-based articles. However, such additives are generally expensive and can greatly increase the cost of the molding composition. In addition, some plasticizers, particularly lower boiling polyalcohols such as glycerin, do not remain in the articles during the heated molding process. It has been observed that such additives are removed from the compositions along with the water as it escapes as steam. To the extent that humectants and plasticizers remain within the starch-based articles, the resulting benefits are often offset by associated disadvantages. One of the primary disadvantage of using humectants and plasticizers throughout the entire starch-based cellular matrix is the possibility of over softening and partial collapse of the structure of the article. The strength of the articles is significantly reduced in a collapsed region.

Coating starch-based articles can also improve certain mechanical properties such as strength and water-resistance. Examples of conventional coatings utilized with starch-based articles include plastics such as polyethylene, which is resistant to water and generally non-biodegradable. In general, water-borne coatings are more desirable and ecologically friendly. However, the application of water to the surface of starch-based articles often leads to extreme softening of the surface, dimensional instability, and warping.

In light of the foregoing, what are needed are compositions and methods for improving the properties of starch-bound articles such that the articles have properties similar, or even superior, to paper, paperboard, metal, polystyrene, plastic, or other organic materials, thereby replacing the foregoing materials as the material of choice in the mass-production of containers and other articles.

It would also be an improvement in the art to provide compositions and methods that allowed for the manufacture of starch-bound containers and other articles without the need for prolonged, high-humidity conditioning in order to obtain the required flexibility, toughness, or fracture energy.

Additionally, it would be an improvement in the art to provide compositions and methods that allowed for the manufacture of starch-bound containers and other articles without the need for adding humectants or plasticizers within the molding compositions in order to obtain the required flexibility, toughness, or fracture energy.

It would also be a further improvement in the art to provide compositions and methods that yielded starch-bound containers and other articles having increased dimensional stability and resistance to warping when water-borne coatings or other surface treatments are applied.

From a practical point of view, it would be a significant improvement in the art to provide compositions and methods that made possible the manufacture of starch-bound containers and other articles at a cost that was comparable to, or even less than, existing methods for manufacturing containers or other articles from paper, paperboard, metal, plastic, polystyrene, or other organic materials.

It would further be a significant improvement in the art to provide compositions and methods that yielded containers and other articles having comparable critical mechanical properties for a specific use, such as, e.g., flexibility, strength, toughness, etc., compared to paper, paperboard, polystyrene, plastic, or other organic materials.

It would yet be a further improvement in the art to provide compositions and methods for manufacturing starch-bound containers and other articles that included a substantial quantity of inorganic mineral filler without undue increase in stiffness and brittleness.

Such compositions, methods, and articles are disclosed and claimed herein.

SUMMARY AND OBJECTS OF THE INVENTION

The present invention involves glycerin-based compositions and methods for treating the surface of starch-based articles. The steps involved in treating a starch-based article include obtaining or providing a starch-based article and then applying a polyalcohol-based liquid, such as one that includes glycerin, to at least a portion of the starch-based article, thereby treating that portion of the starch-based article. The surface treatment acts to plasticize, stabilize, and humidify the surface of the article.

By way of background, starch-bound articles, particularly those having a foamed cellular matrix, are generally manufactured as follows. First, an appropriate starch-based composition capable of being molded between heated dies is provided. The composition typically includes a significant quantity of ungelatinized starch, such as unmodified starch granules derived from potatoes or corn. In their native or modified state, starch granules do not appreciably increase the viscosity of the composition but act as solid particulate fillers as long as the molding composition is kept below the gelation temperature of the starch granules. Typically, the gelation temperature of starch granules is between about 65° C. to about 95° C., depending on the type of starch granules involved. In some cases, a small quantity of pregelatinized starch or other thickening agent is added to help disperse the fibers and/or to keep the solid components dispersed throughout the starch-based composition.

Next, the molding composition is placed between heated molds corresponding to a desired shape of the molded article. Upon closing the male and female molds around the composition, the composition is quickly heated to above the boiling point of water, which is also typically above the gelation temperature of the modified starch granules. This causes the gelation of the starch granules and subsequent removal of water by evaporation. Removing the water by evaporation causes the gelatinized starch to harden into a relatively strong binding matrix.

The molds used to manufacture the starch-bound articles typically include a plurality of vent holes through which the excess composition and pressurized water vapor can escape. The buildup of pressure within the molds is beneficial because it aids in forming the cellular matrix. Once the articles have been molded and the optimal amount of water has been removed by evaporation, they are removed from the molds and treated by one or more optional post-formation processes such as conditioning, coating, laminating, printing, cutting, assembling, and the like. Applicants have now discovered that applying glycerin to the newly demolded articles greatly improves the mechanical properties of the articles.

Application of glycerin as a post-production treatment is advantageous for a number of reasons: (1) the glycerin is not wasted, i.e., it is not removed by steam distillation during molding such as what occurs when added to the molding mixture; (2) it is concentrated at the surface of the article where the greatest softening effect is desired, although it can penetrate to any desired depth depending on the quantity used and carrier solvent employed; (3) it stabilizes the surface of the articles so that the later application of water-borne substances (such as coatings) does not cause the article to warp or otherwise lose dimensional stability; (4) it acts as a humectant to regulate the moisture content by allowing the article to absorb a certain amount of moisture from ambient air; (5) it is non-toxic and is routinely added to foodstuffs, which obviates any problems associated with leaching; and (6) it is essentially nonvolatile at room temperature.

Glycerin may be applied to the molded starch-bound articles in solutions of varying concentration, usually dissolved in water to aid in penetrating the starch-bound matrix. Other less preferred polyalcohols within the scope of the present invention include polyethylene glycols, propylene glycol, polypropylene glycols, and sorbitol. The mixture of glycerin and water may optionally include a water-based coating, such as polyvinyl alcohol, and/or an inorganic mineral such as kaolin. Other useful water-based coatings include polylactic acid and natural latex. As long as the glycerin concentration is greater than about 15% by weight of the solution and preferably greater than about 25%, warping is substantially prevented, even when water is used as a carrier solvent with the glycerin.

The net amount of glycerin that is applied per unit area of the starch-bound cellular matrix being treated is preferably in a range from about $1 \times 10^{-4}$ g/cm$^2$ to about $4.5 \times 10^{-3}$ g/cm$^2$ and more preferably from about $1 \times 10^{-4}$ g/cm$^2$ to about $2.5 \times 10^{-3}$ g/cm$^2$. Optimal results have been found to occur when glycerin is applied in an amount of about $5 \times 10^{-4}$ grams of glycerin per cm$^2$ of starch-bound cellular matrix being treated.

Penetration can also be increased by increasing the temperature of either the starch-based article and/or the glycerin to a temperature greater than ambient temperature. This increases the solvating activity of both the glycerin and the water vis-a-vis the starch binder within the matrix. Accordingly, it is within the scope of the present invention to heat the article or the glycerin to increase the tendency of the glycerin to penetrate into the starch-bound matrix. Preheated glycerin can also be immediately applied to a newly demolded article while still hot. Optimal penetration occurs when the article and the glycerin have an average temperature in a range from about 80° C. to about 90° C.

The glycerin treatment is especially advantageous in the case where the article includes a hinge in order to increase the resilience and durability of the hinge, particularly by causing the inner hinge surface to be more collapsible, which greatly decreases the radius of bending of the outer surface of the hinge and which thereby reduces the amount of strain or elongation exerted on the outer surface of the hinge. The outer surface of the hinge can advantageously include a coating to reinforce the matrix to resist fracture upon elongation during the hinging action. Pretreating the outer hinge area with glycerin advantageously stabilizes the starch-bound cellular matrix so that significant quantities of a water-borne coating can be applied to the outer hinge surface, either concurrently with the glycerin treatment or in a subsequent coating process.

The use of glycerin as a post-formation treatment is particularly advantageous in those cases where substantial quantities of fibers and inorganic mineral filler are included within the starch-bound cellular matrix. Filler materials usually constitute by far the least expensive component within the starch-based composition, which greatly decreases the materials cost of the molding process. The inclusion of fibers allows for the inclusion of far greater amounts of inorganic filler materials, such as calcium carbonate, mica, clay, and the like, because the fibers are able to offset the loss of strength and increase in brittleness that generally occurs as a result of adding non-reinforcing fillers.

Compositions that include appreciable quantities of inorganic filler materials also yield a molded product that can withstand greater variations in ambient moisture. For example, it is known that articles manufactured from compositions that include mostly starch and water are quite sensitive to variations in ambient moisture. As a result, they must be sealed in plastic, coated and/or impregnated with a water-resistant polymer, or else they can become "soggy" when exposed to high humidity, such as in tropical climates. In contrast, molded starch-bound articles that include appreciable amounts of fibers and inorganic fillers have been found to be far more resistant to wide fluctuations in ambient humidity and temperature.

While including well-dispersed fibers greatly offsets the stiffening and weakening effect of adding inorganic mineral fillers, surface treating the articles with glycerin further reduces the brittleness and increases the toughness and resilience of the articles beyond that which is possible using fibers alone. The use of glycerin as a post-formation surface treatment makes it possible to derive all of the foregoing benefits from the use of large quantities of inorganic mineral filler while offsetting or avoiding the deleterious stiffening effect of using a large quantity of inorganic filler.

In light of the foregoing, an object of the present invention is to provide compositions and methods for improving the properties of starch-bound articles such that the articles have properties similar, or even superior, to paper, paperboard, metal, plastic, polystyrene, or other organic materials, thereby replacing the foregoing materials as the material of choice in the mass-production of containers and other articles.

It is also an object of the present invention to provide compositions and methods which allow for the manufacture of starch-bound containers and other articles without the need for prolonged, high-humidity conditioning in order to obtain the required flexibility, toughness, or fracture energy.

Additionally, it is an object of the present invention to provide compositions and methods that allow for the manufacture of starch-bound containers and other articles without the need for adding humectants or plasticizers within the molding compositions in order to obtain the required flexibility, toughness, or fracture energy.

It is a further object and feature of the present invention to provide compositions and methods that yield starch-bound containers and other articles having increased dimensional stability and resistance to warping when water-borne coatings or other surface treatments are applied.

Furthermore, it is an object of the present invention to provide compositions and methods that make possible the manufacture of starch-bound containers and other articles at a cost that is comparable to, or even less than, existing methods for manufacturing containers or other articles from paper, paperboard, metal, plastic, polystyrene, or other organic materials.

It is yet another object of the present invention to provide compositions and methods that yield containers and other articles having comparable critical mechanical properties for a specific use, such as, e.g., flexibility, strength, toughness, etc., compared to paper, paperboard, polystyrene, plastic or other organic materials.

It is a further object of the present invention to provide compositions and methods for manufacturing starch-bound containers and other articles that include a substantial quantity of inorganic mineral filler without undue increase in stiffness and brittleness.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings which are listed hereinafter.

DETAILED DESCRIPTION OF THE PREFERRED EMBODIMENTS

Figure 1:
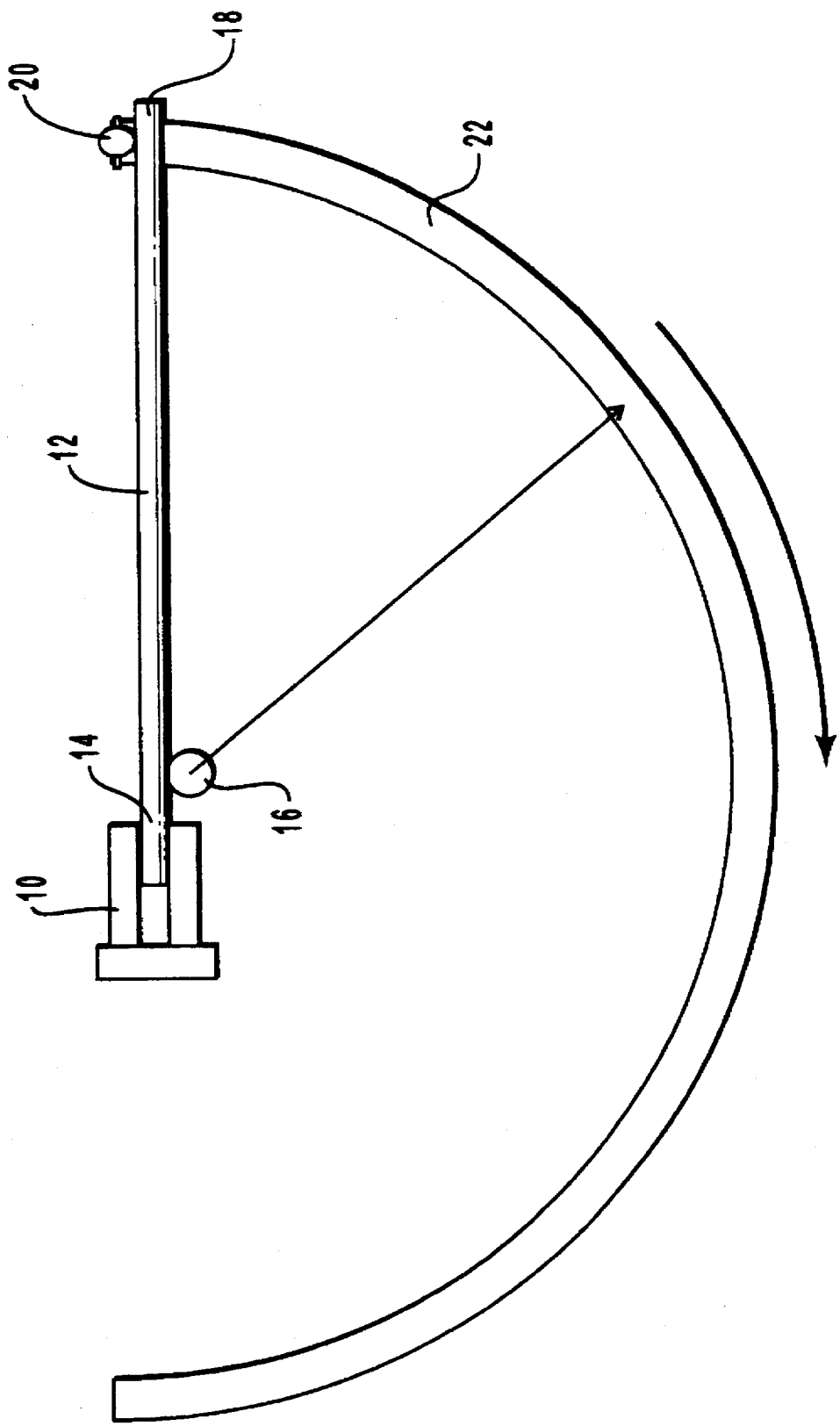
FIG. 1 shows a schematic diagram of an apparatus used to test the bendability of starch-bound matrix samples.

I. INTRODUCTION.

The present invention is directed to compositions and methods for treating starch-based articles with glycerin or other equivalent polyalcohols, either alone or with a carrier solvent such as water. The post-formation glycerin treatment improves the mechanical properties of the starch-bound articles. Glycerin acts as a plasticizing or softening agent that increases the flexibility, toughness, and resilience of the starch-bound cellular matrix. In addition, glycerin acts as a humectant that helps to regulate the moisture content of the article in ambient conditions such that a desired moisture balance is maintained within the starch-bound cellular matrix. Glycerin also improves the dimensional stability of the demolded articles by making the starch-bound cellular matrix more resistant to warping or deformation when subjected to moisture. The softening effect of glycerin offsets the stiffening effect of including substantial quantities of an inorganic mineral filler.

In general, starch-based compositions can be molded to yield a variety of articles, including containers, plates, cups, "clam shell" sandwich containers, platters, cartons, boxes and other types of containers and articles having mechanical properties that are substantially similar or even superior to articles manufactured using conventional materials, such as paper, polystyrene foam, plastic, metal and glass. Starch-bound articles can usually be made at a fraction of the cost of using conventional materials because of the generally lower cost of the materials inputs and also because of lower overall energy requirements.

The manufacturing processes and resulting articles are less harmful to the environment compared to conventional materials and processes. First, theoretically all of the waste associated with the manufacturing process can be directly recycled back into the production line. Second, once the generally disposable articles have fulfilled their intended use, the starch-bound articles are easily recycled into other articles or similar materials with minimum processing. Third, if discarded into the environment, the starch-based binder and other organic components of the articles are in a state which makes them quickly dissolve and/or biodegrade in the presence of moisture, while the inorganic filler is already largely compatible with the earth into which it may be disposed. Fourth, the inventive articles are of generally low mass.

II. DEFINITIONS.

The terms "starch-based composition" or "molding composition", as used in the specification and the appended claims, refers to starch-containing compositions of appropriate rheology that can be molded within heated molds to form articles having a starch-bound cellular matrix. Such compositions typically include a thickening agent, such as gelatinized starch, an ungelatinized starch component that is gelatinized upon molding in heated molds, well-dispersed fibers, water, an inorganic filler, and, optionally, a mold-release agent, organic fillers, dispersants, cross-linkers, plasticizers, humectants, and integral coating materials.

The term "ungelatinized starch", as used in the specification and the appended claims, refers to native or otherwise ungelatinized starch or starch derivatives that can be added to the molding composition but which will not become gelatinized until the mixture has been heated to above the gelation temperature of the ungelatinized starch during the molding process. The "total starch" in the starch-based composition comprises the combination of pregelatinized starch and ungelatinized starch, which together constitute the "starch-based binder" upon the removal of part or substantially all of the free (or unbound water) from the molding composition.

As used in the specification and the appended claims, the term "total solids" includes the actual solids together with any admixtures that may be added to the starch-based composition that are initially dissolved into the fluid fraction but which will form a solid upon the removal of water by evaporation during or after the molding process.

The terms "fiber-reinforced cellular matrix", "starch-bound cellular matrix" or "starch-bound matrix", as used in the specification and the appended claims, shall refer to the substantially hardened structure of the articles manufactured herein.

The term "hardening", as used in this specification and the appended claims, refers to the process of removing water from the molding mixture, particularly from the starch-based gel, to produce a form-stable article. The term "hardening", however, is not limited by the extent of gelation of the ungelatinized starch component or the amount of water actually removed.

The term "form-stable", as used in the specification and the appended claims, refers to the state in which the starch-bound matrix of the newly demolded article has sufficient strength and structural integrity that it can be removed from the mold, support its own weight against the force of gravity, resist destructive water vapor expansion, and resist significant deformation when exposed to subsequent processing and handling.

The terms "molded article", "starch-bound article", or "article of manufacture", as used in the specification and the appended claims, are intended to include any article that can be formed using the disclosed compositions and processes. Containers and other articles that can be formed using the compositions and processes of the invention include, but are not limited to, the following: cartons, boxes, sandwich containers, hinged or two-part "clam shell" containers, dry cereal boxes, frozen food boxes, milk cartons, fruit juice containers, carriers for beverage containers, ice cream cartons, cups (including, but not limited to, disposable drinking cups and cone cups), french fry scoops, fast-food carry out boxes, packaging, support trays (for supporting products such as cookies and candy bars), cans, yoghurt containers, sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups or food containers, cushioning materials (i.e., "peanuts"), bottles, jars, cases, crates, dishes, lids, straws, partitions, liners, anchor pads, corner braces, corner protectors, clearance pads, hinged sheets, trays, gels, cushioning materials, and other objects used in packaging, storing, shipping, portioning, serving, or dispensing an object within a container, and an endless variety of other objects.

III. STARCH-BASED COMPOSITIONS.

The following discussion discloses the identities, properties, and preferred proportions of each of the components that may be added to the molding compositions, along with how each component is interrelated with the processing parameters, properties of the moldable composition, and properties of the final starch-bound articles.

A. Starch.

The molding compositions used to manufacture starch-bound articles include starch as the primary binder, which acts as a binder through the formation of a starch gel and subsequent removal of water by evaporation from the starch gel. Starch is a natural carbohydrate chain comprising primarily condensed glucose molecules stored in plants in granular form.

In general, starch granules are insoluble in cold water and are gelatinized by raising the water temperature to above the gelatin temperature of the starch granules. When the starch granules are exposed to hot water, the granule walls soften, swell, and then burst to release the starch chains: which results in the gelation of the liquid fraction of the mixture. The exact temperature at which a particular starch granule swells and gelates depends on the type of starch it is. Cornstarch, for example, gelates at a higher temperature than potato starch. Unmodified starch granules can be gelated in cold water if the outer membrane has been broken by, e.g., grinding the starch granules. Alternatively, starch can be chemically modified so that it will gelate in cold water. Gelated and hardened starch binds the individual filler particles and fibers within the composition that has been molded into the desired shape of the article.

Although starch is produced in many plants, an important source are seeds of cereal grains (e.g., corn, waxy corn, wheat, sorghum, flee, and waxy rice). Another important source includes tubers such as potatoes, roots such as tapioca (i.e., cassava and manioc), sweet potato, and arrowroot, and the pith of the sago palm.

The term "starch" includes both unmodified and modified starches. By "modified," it is meant that the starch can be derivatized or modified by typical processes known in the art such as, e.g., substitution, esterification, etherification, oxidation, acid hydrolysis, cross-linking, and enzyme conversion. Typical modified starches include esters, such as the acetate and the half-esters of dicarboxylic acids/anhydrides, particularly the alkenylsuccinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

A smaller portion of the starch within the molding composition is preferably gelatinized in order to aid the dispersion of the components throughout the composition, particularly the fibers. In addition, the gelatinized starch fraction keeps the solid components from settling within the composition. The starch can be gelatinized by heating unmodified starch in the presence of water, or by adding a modified starch to the aqueous composition.

Nevertheless, the unmodified starch component will generally comprise the majority of total starch within the molding composition. In its modified, granular state, unmodified starches will not gelate in cold water and do not appreciably affect the rheology of the liquid fraction of the molding composition. Hence, unmodified starch can be included in significantly large amounts without greatly affecting the rheology of the molding composition since their primary effect on system rheology is negligible until the composition is heated during the molding process. Once the starch-based composition has been properly positioned within the heated molds, the increased viscosity and green strength imparted by the newly gelated unmodified starch component is advantageous.

From a cost standpoint, it is advantageous that the majority of total starch comprises unmodified starch granules, which are typically far less expensive compared to modified starches. In fact, unmodified starch granules derived from potato starch are very inexpensive and are often treated as useless waste products. In some countries it is discarded or fed to cattle as a cheap feed material. Hence, the use of unmodified starches provides a tremendous economic advantage over other materials and also provides a useful outlet for such previously discarded materials.

A preferred starch is potato starch, which quickly gelates and reaches a maximum viscosity and yield stress at about 65° C. The viscosity and yield stress of a mixture containing gelatinized potato starch and water then decreases as the temperature is raised further until water is evaporated, after which the viscosity and yield stress increase precipitously. Waxy corn starch acts in a similar fashion and is also preferred. Potato and waxy corn starch are also preferred because they swell and gelate easily in a single step; however, any starch that has similar swelling characteristics will be preferred to those that swell in two or more stages.

B. Water.

Water is an important component within starch-based compositions used to mold starch-bound articles. Water aids in the dispersion of the fibrous component throughout the starch-based composition. Water is important for overall molding composition rheology in order to obtain a composition that can be readily mixed, transported, and injected into the molding apparatus. Water is important in lubricating the solid particles, solvating the dissolvable or gelatable components and in achieving the proper viscosity and yield stress of the composition. The water acts as a gelating agent that gelates the ungelatinized starch granules during the heated molding process. The subsequent removal of water by evaporation from the starch causes it to solidify and bind the solid components together within the molded article. Finally, the water aids in forming the cellular structure.

At a minimum, a sufficient amount of water should be added to disperse and uniformly gelate the starch within the molded starch-based composition. The water content should also be sufficient to function with the particular processing equipment being employed.

Increasing the water content increases the number and size of the cells or voids in the structural matrix and lowers the density of the resulting article. In theory, the more water in a mixture, the more vapor that is produced, and thus, the more cells in the interior and the more pinholes in the surface that are formed. In contrast, using less water yields a more dense product having smaller cells.

The amount of water that is added to the molding compositions used to manufacture starch-bound articles will preferably be in a range from about 15% to about 80% by weight of the mixture, and more preferably from about 30% to about 70% by weight.

C. Fibers.

The terms "fibers" and "fibrous materials" include both inorganic fibers and organic fibers. The use of fibers has been found to provide a number of useful benefits. Fibers serve to reinforce the structural matrix of the molded articles. More specifically, they serve to increase the cohesion of the partially hardened articles, giving them increased form stability; they also increase the elongation, deflection, toughness, fracture energy, flexural strength, and tensile strength of the articles. Fibers also aid retaining small amounts of residual water within the newly molded articles by preventing collapse or over expansion of the cellular structural matrix due to the softening effect of the water. In the prior art, articles had to be over dried in order to be successfully demolded, then conditioned to reimpart moisture and reduce brittleness.

It has been found that the greatest benefit occurs when fibers preferably having a length greater than about 1.5 mm are used and/or fibers having an aspect ratio of at least about 25:1. More preferably, the fibers will have a length greater than about 2 mm. Most preferably, the fibers will have a length greater than about 3.5 mm and an aspect ratio of at least about 100:1. Of equal or greater importance is the level of dispersion of the fibers. More homogenous dispersion of the fibers results in far greater strength and toughness of the final product. On the other hand, poorly dispersed or clumped fibers often result in a decrease in strength compared to compositions in which no fibers are used. The use of significant quantities of pregelatinized starch in the molding composition aids in the homogenous dispersion of fibers throughout the composition by transferring shear from the mixing apparatus down to the fiber level.

Fibers that may be used preferably include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, husks, shells, and fruits, or inorganic fibers made from glass, graphite, silica, ceramic, or metal materials. Any equivalent fiber which imparts strength and flexibility is also within the scope of the present invention. Recycled paper fibers can be used but are somewhat less desirable because of the fiber disruption that occurs during the original paper manufacturing process.

The amount of fibers added to the molding composition will vary depending upon the desired properties of the final molded article. The flexural strength, toughness, flexibility, and cost are principle criteria for determining the amount of fiber to be added to the composition. The concentration of fibers will preferably be in a range from about 1% to about 40% by weight of the molding composition, more preferably from about 2% to about 20% by weight, and most preferably from about 3% to about 10% by weight.

D. Solid Fillers.

The term "fillers", as used in the specification and the appended claims, includes both inorganic and inert organic filler particles but does not typically include fibers, except fibrous materials having very low aspect ratio and which impart little or no strengthening effect. In general, fillers do not strengthen the structural matrix, but merely add mass and reduce the starch requirements. However, inorganic mineral fillers generally increase the stiffness of the articles, which is advantageous where a stiffer article is desired. Mineral fillers also help the article resist mechanical deformation when exposed to changes in ambient moisture.

Inorganic materials commonly used in the paper industry, as well as more finely ground filler materials used in the concrete industry, may be used in the molding compositions. Examples of useful inorganic fillers include perlite, vermiculite, sand, gravel, rock, limestone, sandstone, glass beads, aerogel, xerogels, seagel, mica, clay, synthetic clay, alumina, silica, fly ash, fused silica, zeolites, tabular alumina, kaolin, microspheres, hollow glass spheres, porous ceramic spheres, gypsum (calcium sulfate dihydrate), calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials.

A dry-milled calcium carbonate is a preferred inorganic aggregate, since it can be obtained at one-third the cost of calcium carbonate obtained through wet-milling. A preferred calcium carbonate is R040, which has a particle size range from about 10 to 150 microns, with an average particle size of about 42 microns, and a low specific surface area. Both clay and gypsum are particularly important aggregate materials because of their ready availability, extreme low cost, workability, ease of formation, and because they can also provide a degree of binding and strength if added in high enough amounts (in the case of gypsum hemihydrate).

Examples of fillers which can add a lightweight characteristic and higher insulation to the molded articles include perlite, vermiculite, glass beads, hollow glass spheres, synthetic materials (e.g., porous ceramic spheres, tabular alumina, etc.), cork, pumice, and lightweight expanded clays, sand, gravel, rock, limestone, sandstone, and other geological materials.

The inorganic filler is preferably included in an amount in a range from about 20% to about 80% by weight of solids in the starch-based composition, preferably in a range from about 30% to about 70%, and more preferably in a range from about 40% to about 60% by weight. If included, inert organic fillers will preferably be included in an amount in a range from about 5% to about 60% by weight of the total solids. If included, lightweight fillers, defined as those having a density lower than about 1 g/cm$^3$, are preferably included in an amount in a range from about 5% to about 85% by weight of the inorganically filled molding composition, more preferably from about 15% to about 65%, and most preferably from about 25% to about 55% by weight.

E. Mold-Releasing Agents.

To assist in demolding the newly formed articles, a mold-releasing agent can be added to the moldable composition. Medium- and long-chain fatty acids, their salts, and their acid derivatives can be used as mold-releasing agents. Preferred mold-releasing agents for use in the present invention include stearates, which have hydrophobic properties and are not soluble in water. Stearates are salts of stearic acid and have the general formula of $CH_3(CH_2)_{16}COO^-X^+$, where $X^+$ can be an ion of Al, Mg, Na, K, or Ca. Aluminum stearate is one preferred mold release agent that has been approved by the FDA.

Silicones can also be used as mold releasing agents. Lecithin, which is a mixture of phosphatides and glycerides, can contribute to lessening of the stickiness of the molding composition, providing mold releasing properties, and can improve the flexibility of the formed articles. Various waxes such as paraffin and bees wax, and Teflon-based materials can also be used as mold-releasing agents. To further assist in releasing the articles from the molds, the molds can be polished, chrome plated, or coated with, e.g., nickel, Teflon, or any other material that limits the tendency of the articles to stick to the molds.

IV. PROCESSING APPARATUS, CONDITIONS, AND RESULTS.

Starch-bound articles of manufacture are typically produced through a multi-step process, which includes preparing the mixture and then molding the composition at an elevated temperature into the desired articles. Additional optional processing steps may include, for example, printing, coating, conditioning, and packaging of the final articles, in addition to the inventive post-formation treatment with glycerin.

A. Preparing the Mixture.

There are a number of different mixing apparatus and mixing sequences that can be used to yield the compositions of the present invention. The only criterion is that the mixing means be able to yield a starch-based composition in which all of the components, particularly the fibrous material, are substantially homogeneously mixed throughout the composition. Both high shear and low shear mixing apparatus are preferred depending on the stage of the mixing process. Typically, the formation of a pregel mix and also the dispersion of fibers is carried out using a high shear mixing apparatus. However, when mixing in the additional ungelatinized starch component and also fragile inorganic fillers which are more easily broken, it will generally be preferable to use a low shear mixer in order to protect the starch granules from prematurely gelatinizing and also to prevent the fragile aggregate fillers from breaking.

Examples of high shear mixers include the TMN turbo batter mixers that are available from Franz Haas Waffelmaschinen, Industriegesellschaft M.B.H. of Vienna, Austria. Alternative high shear mixers are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference.

Alternatively, a variable speed mixer can be used to provide both high and low shear mixing. Variable speed mixers include the Eirich Rv-11. An example of a low shear mixer is a Hobart Mixer.

Once the components have been adequately dispersed throughout the starch-based composition, the starch-based composition is ready for molding. It may be deskable at this stage to increase the water content in order to adjust the viscosity of the molding composition to a desired level.

B. Forming the Mixture into the Desired Article.

Once the molding has been prepared, it is preferably formed into the desired shape of the article through the use of heated molds. A detailed description of molding apparatus that may be used to mold the articles of the present invention is set forth in Ser. No. 08/353,543, referenced above. Ser. No. 08/353,543 also sets forth a detailed description of preferred methods for generally molding starch-based compositions using the disclosed apparatus.

The molding apparatus should be heated to a temperature that is sufficiently high to cause the rapid expansion of a starch-based composition within the molding apparatus and also in order to drive off a substantial portion of the water by evaporation. Preferably, the molding apparatus should be heated to a temperature greater than about 145° C., more preferably greater than about 175° C., and most preferably greater than about 195° C. The temperature should not be so great, however, so as to cause burning, scorching or carmelization of the starch binder. This generally occurs at temperatures greater than about 250° C. In most cases, it will be preferable to maintain one mold at a temperature that is slightly hotter than the other mold, such as 5° or 10° C. hotter. It has been found that the molded article will be more easily released from the mold kept at the hotter temperature, thereby designating the mold from which the article will be removed last.

The molds may optionally include special features that result in a hinged area, which is generally formed by molding a crease or indentation in the area where it is desired for the article to bend or hinge without fracturing. The glycerin treatment described hereinafter is especially advantageous in increasing the strength and resiliency of the hinge.

By using the compositions and methods disclosed herein, a wide variety of different articles can be molded that will have adequate strength and structural integrity to be demolded and then shipped to the desired destination without the need for a subsequent lengthy conditioning step. The ability to manufacture articles without a conditioning step, or simply a very short conditioning step, is a significant improvement over the prior art.

V. POST-FORMATION TREATMENT WITH GLYCERIN.

1. Introduction.

It is within the scope of the present invention to treat any type of starch-containing article with glycerin. However, the post-formation glycerin treatment is particularly beneficial when used to treat starch-bound articles formed by the preferred compositions and methods set forth hereinabove.

Articles formed by the compositions and methods set forth herein have a nonuniform starch-bound cellular matrix that can be classified as having two distinct portions: the higher density outer skin portion having lower porosity and the lower density interior portion of the matrix having greater porosity. The interior portion is generally far more porous and can be characterized as having a foam structure. The pores in the interior portion typically have an average diameter of about 0.25 mm or greater. Not only is the outer skin portion more dense but it is generally far more rigid and brittle compared to the interior portion.

For untreated retrograded starch, the brittleness of the skin increases as the dryness of the skin is increased. The dryness of the skin is primarily a function of initial processing and also ambient relative humidity. The prior art teaches only temporary methods for decreasing the brittleness of the skin by subjecting an article to a time consuming conditioning process in a high humidity environment. Despite the initial benefits of high humidity conditioning, the properties of the article are not permanently altered since the starch tends to give up moisture over time, especially in low ambient relative humidity. Moreover, over conditioning can lead to over softening and a decrease in dimensional stability.

The outer skin layer can be designed to be stronger and more rigid by increasing the thickness of the outer skin layer. By varying the temperature and processing time during formation as set forth hereinabove, it is possible to affect the thickness as well as the density and porosity of the skin. Increasing the thickness of the article, however, also decreases the flexibility of the article, thereby diminishing the usefulness of the article. In general, increasing the temperature of the heated molds, or more precisely, increasing the rate of heat transfer from the mold to the starch-based composition during molding, increases the thickness of the skin. Lowering the mold temperature, or more precisely, decreasing the rate of heat transfer from the mold to the starch-based composition during molding, decreases the thickness of the skin. Varying the level of heat diffusivity within the mold apparatus can result in varying skin thicknesses throughout the same article.

2. The Effects of Glycerin Treatment on Starch-bound Articles.

The application of glycerin to the surface of a molded starch-bound article has been found to provide at least three significant benefits including: (1) softening and plasticizing of the starch-bound article in specific regions with an amount of glycerin that remains essentially constant to provide reliable flexibility; (2) moisture regulation; and (3) structural stabilization of the starch-bound cellular matrix.

Treatment of a starch-bound article with glycerin softens and plasticizes the starch-bound article in the specific region wherein the glycerin is applied to decrease the brittleness and increase the flexibility of the region. As opposed to conventional conditioning techniques utilized to soften and plasticize starch-bound articles, the softening and plasticizing effect of glycerin is not temporary. Nor is it uneven over time because it will remain steady even where there are wide fluctuations in ambient relative humidity. The softening and plasticizing effect is maintained over time because the glycerin is essentially nonvolatile. Accordingly, the durable and long lasting effect of glycerin treatment prevents the starch-bounds articles from reverting back to the original level of brittleness and hardness before treatment. At a minimum, the region of the starch-based article treated with glycerin will remain substantially plasticized throughout the lifespan of the article, which includes the storage and subsequent use of the article.

Glycerin is classified as a "polyalcohol" because it includes a plurality of hydroxyl groups, specifically three hydroxyl groups. As a result, glycerin is hygroscopic and functions as a humectant. Glycerin acts as a humectant by regulating the moisture content within the starch after a starch-based article is treated. More specifically, the glycerin enables the starch-based article to absorb and/or retain a desired amount of moisture under ambient conditions depending on the amount of starch that has been used on the article. In general, any polyalcohol will enable the starch-based article, more particularly the outer skin portion of the starch-bound cellular matrix, to retain more moisture under ambient conditions than before the polyalcohol is applied to the starch-based article.

In contrast to adding glycerin to the starch-based composition used to form an article, post-formation treatment of starch-based articles with glycerin provides reliable 8 moisture regulation. Glycerin treatment affects only the treated portion of the article and to some extent the surrounding region in communication with the treated portion, while articles formed from compositions having added glycerin usually experience little or no softening effect is molded using heated molding apparatus. This is because the glycerin appears to be driven off with the water, probably by means of a steam-distillation mechanism. Moreover, if less volatile plasticizers and humectants are used, they can nevertheless cause random structural collapse due to over softening, particularly at the very early stages when the article is hot just after demolding.

Post-formation treatment with glycerin avoids the unnecessary waste resulting from the use of glycerin within the starch compositions, which is mostly removed during the formation process. Additionally, glycerin treatment also avoids any uncertainty as to the amount of glycerin present in the article since the amount of glycerin applied to a starch-based article remains essentially constant after application due to the low rate of evaporation of glycerin under ambient conditions. Moreover, post-formation treatment with glycerin allows for varying amounts of glycerin to be applied to different regions of the article in order to provide varying levels of plasticizing and humectifying if desired.

Glycerin also acts to stabilize the structure of the starch-bound cellular matrix. After a starch-bound article has been treated with glycerin it will tend to more reliably resist warping or other dimensional changes if further subjected to surface moisture, such as steam or liquid water. Further exposure to surface moisture may result from high relative humidity, food or beverages, or through the application of water-based coatings.

The area treated with glycerin can range from the entire article to a pinpointed portion or region. By treating only a specific region of a starch-based article with glycerin, the flexibility of the article is increased only in the treated region while the untreated remainder of the article is unchanged. For instance, it may be desirable to soften or plasticize only one side of a portion of the article, such as at specific points of flexure. Additionally, strategic application of glycerin in varying amounts can provide varying degrees of softening throughout the article.

3. Glycerin Compositions.

It is within the scope of the present invention to treat starch-based articles with any polyalcohol characterized as providing a softening and plasticizing effect on starch-based articles. A preferred polyalcohol is glycerin due to its known lack of toxicity. In fact, it is routinely added to foodstuffs. Nevertheless, other polyalcohols within the scope of the present invention include polyethylene glycol, propylene glycol, polypropylene glycol, sorbitol, and mixtures thereof. It is preferable for the polyalcohol to be nontoxic, particularly if the container or other article is intended to come into contact with food or beverage. For this reason, ethylene glycol has not been listed as a preferred polyalcohol, although it can also provide the aforementioned advantages.

While it is within the scope of the present invention to use 100% glycerin, or 100% of another polyalcohol, the polyalcohol is preferably diluted by a carrier such as water or any other liquid capable of enhancing the ability of the polyalcohol to enter into the starch-based article. A carrier such as water helps the polyalcohol to penetrate the pores in the skin of the starch-based article and to be absorbed more deeply into the starch-bound matrix. In general, optimum penetration occurs when the viscosity of the glycerin solution is reduced to below about 10 cps by means of diluting the glycerin with water. In addition, the water is immediately available to increase the moisture content of the starch-bound matrix. The preferred aqueous glycerin composition comprises at least about 15% glycerin by weight of the aqueous solution, and more preferably at least about 25% glycerin by weight of the aqueous solution. As long as the glycerin is included in an amount of at least about 15%, the article will be stabilized against the tendency of the water to cause warping of the article.

Besides water and glycerin, the post-treatment solution can include optional components, such as water-based coatings or inorganic fillers. A preferred water-based coating is polyvinyl alcohol (PVA), which is biodegradable but which helps the article resist damage or warping by water or steam. Other water-based coatings include polylactic acid and natural latex. Inorganic fillers are particularly useful to decrease the glossiness resulting from the glycerin content and to provide increased printability or receptivity to inks and the like. A preferred inorganic mineral filler is kaolin. One preferred aqueous glycerin composition comprises by weight of the total composition: 25% glycerin, 47% water, 11% PVA and 17% kaolin.

4. Methods For Treating Starch-bound Articles with Glycerin.

The post-fort-nation application of glycerin to a starch-based article results in improved mechanical properties of the outer skin portion, and to some extent the inner portion if enough glycerin is applied to penetrate through the skin portion. Treating a starch-based article with glycerin should be distinguished from applying a typical coating material, which alters the strength and mechanical properties of the article as a whole and which may properly be viewed as a composite comprising the starch-bound cellular matrix and the surface coating. In contrast, the glycerin treatment actually alters the properties of the starch-bound cellular matrix itself. Rather than coating the surface, the glycerin penetrates into and alters the properties of the starch binding matrix. In general, conventional coatings act as a sealant or protective layer bonded onto the article or encapsulating the article.

Nevertheless, due to how the glycerin solution is applied, any coating technique known in the art is within the scope of the present invention and may be used to apply glycerin to the starch-based articles. The glycerin may be applied, for example, by spraying or painting glycerin onto the surface or dipping the article into a vat containing glycerin.

Glycerin is most economically applied as a liquid at ambient conditions; however, it can also be applied at elevated temperatures as a liquid or a gas. In one embodiment of the present invention, the glycerin is applied to a starch-based article at approximately the same temperature at which the article is formed. It is also within the scope of the present invention to warm-up or preheat the starch-based article that has been formed and allowed to cool to ambient conditions. For starch-based articles formed using the preferred compositions and methods set forth above, penetration of the glycerin is optimized when the article has a temperature in a range from about 80° C. to about 90° C. and when the glycerin is heated to a temperature in a range from about 80° C. to about 90° C.

In general, the article is ready to use or may be further treated immediately or shortly after treatment with glycerin. However, if aqueous solutions including higher concentrations of water are used, it may be desirable to subject the article to further drying prior to applying further amounts of water, such as a water-based coating. As set forth above, the aqueous glycerin solution can optionally include a waterborne coating material.

The amount of glycerin that is applied to the starch-based articles will vary depending on the type of glycerin solution used and based on the desired properties of the resulting article. In general, the amount of glycerin applied to the surface of the molded starch-bound articles, particularly the interior skin portion of the hinge, will be within a range from about $1\times10^{-4}$ g/cm$^2$ to about $4.5\times10^{-4}$ g/cm$^2$, more preferably in a range from about $1\times10^{-4}$ g/cm$^2$ to about $2.5\times10^{-4}$ g/cm$^2$. Accordingly, for a clam shell container used to serve hamburgers, it is presently preferred to apply about 0.05 g of a 50/50 mixture of glycerin and water to the interior skin portion of the hinge such that it is treated with about 0.025 g glycerin net.

5. Specific Applications of Glycerin.

The foregoing glycerin treatment can be utilized to improve the resilience and flexibility of a starch-bound matrix by softening and humectifying the starch-based article through a general application to the entire article or to a specific designated portion. Treating a specific region to increase the flexibility of only the treated region provides several benefits. For example, the treated region can be repeatedly bent without failure while the dimensional stability of the untreated portion of the article is better maintained.

A hinged area in a starch-based article is an example of a region that is particularly benefited through an increase in flexibility. In general, treating the hinge area with glycerin will cause a general increase in flexibilty and resilience, which will tend to increase the life and efficacy of the hinge. Moreover, a more precise understanding of the mechanics involved in the hinging process will illustrate why the glycerin treatment is especially beneficial when applied to the inside skin portion of the hinge as opposed to the outside skin portion.

The "inside skin portion" of a hinge is the side of the hinge toward which the article bends. This results in a tendency of the inside skin portion to compress or collapse as the article is hinged for the first time. The "outside skin portion" is the side of the hinge away from which the article bends. This results in a tendency of the outside skin portion to elongate or stretch as the article is hinged for the first time. The softening effect of glycerin provides for far easier collapse of the inside skin portion without fracture while only modestly increasing the ability of the outside skin portion to elongate without fracture. Enhanced compression and collapse of the inside skin portion nevertheless benefits the outside skin portion, if only indirectly, because it tends to reduce the distance of the point of bending from the outside skin portion. In other words, a more easily collapsed inside skin portion results in a shorter bending radius for the outside skin portion, which decreases the distance the outside skin portion must be elongated for a bend of a given angle. This reduces the strain on the outside skin portion, which decreases the tendency for fracture and increases the life of the hinge.

It is surprising that enhancing the ability of the inner surface to compress increases the bendability or the flexibility of the hinge based on the theory and equation for elastic behavior. The theory for strength of conventional materials indicates that flexibility is controlled by the maximum tensile strain that a material can withstand and given by the equation: $R=t/2\epsilon$, wherein R is the minimum radius over which the hinge can be bent, t is the thickness of the hinge and $\epsilon$ is the maximum tensile strain of the material in tension. Accordingly, glycerin with its plasticizing effect would be expected by one of ordinary skill to increase the tensile strain of a starch-based article and hence enhance the flexibility when applied to the tensile surface of the outer surface of a hinge. On this basis, it is surprising that the flexibility of a starch-based article is increased more by decreasing the compressive strength of the article than by enhancing the tensile strain limit. A decrease in compressive strength results in the collapse of the structure at the inside surface which leads to the effective reduction of the hinge thickness and hence the total strain seen by the outer surface or the tensile face. It can be seen from the equation that the reduction of thickness leads to a decrease in the radius of curvature.

An additional benefit of the collapsed structure on the interior surface is that the strain is distributed over a larger area. For example, a double bend often occurs instead of a single bend observed for a less pliable material when a sheet having a starch-bound matrix is bent to form a hinge.

C. EXAMPLES OF THE PREFERRED EMBODIMENTS

Outlined below is a comparative example and a series of examples of the present invention setting forth the results of the treatment of inorganically filled, starch-bound, moldable sheets with aqueous glycerin compositions. The dramatic improvement in toughness and flexibility of the articles resulting from the glycerin treatment clearly demonstrates the advantage of glycerin treatment.

Comparative Example 1

Glycerin was added to a starch-based composition before the composition was molded into an article. Articles formed from these starch-based compositions containing glycerin yielded little improvement over articles formed without glycerin. The moisture pick up behavior and mechanical test data indicated that the addition of glycerin into the composition before baking the composition was ineffective in improving the flexibility of the articles. It is suspected that a major fraction of the glycerin was lost during the baking process, perhaps due to a mechanism such as steam distillation.

Example 1

A bend angle test was developed to quantify the effect of glycerin on the flexibility of the starch-based articles. FIG. 1 is a schematic diagram of the test apparatus utilized to measure the flexibility of starch-based samples. The test involved utilizing a clamp 10 to hold a strip 12 of a foamed starch sheet at one end 14 and then bending strip 12 around a pin 16 by the application of moment at the other end 18 of strip 12 by a sliding pin 20 in a circular track 22. Circular track 22 has graduations for measurement of the bending angle. The bending angle over which the strips were bent before a crack was visually observed on the tensile face or the outer surface of the hinged portion of each strip was then manually noted.

The strips were excised from the base of a two-piece clam shell container having a starch-bound matrix. The dimensions of the strips were 15 mm×80 mm. The strips were sprayed at four levels of glycerin-water solution and allowed to equilibrate at three different relative humidity conditions. The containers had 0, 0.3 g, 0.6 g, and 0.08 g of solution and were conditioned at 15%, 40%, and 80% relative humidity. The samples were tested with the coated side in compression which was the inside surface as the strips were bent.

Figure 2:
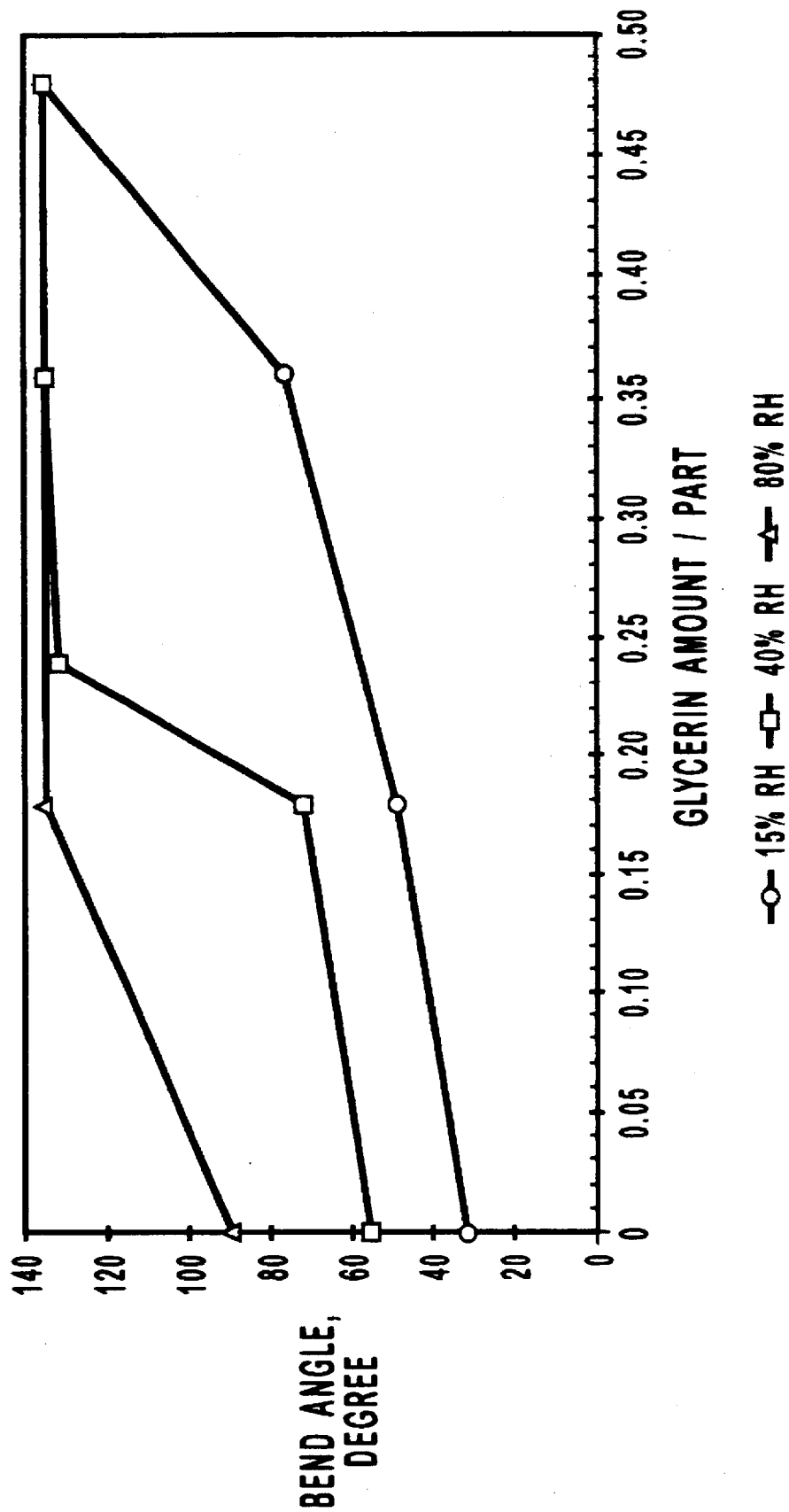
FIG. 2 is a graph showing the effect of using varying amounts of glycerin and varying the relative humidity on the maximum allowable bend angle before fracture of the starch-bound cellular matrix.

The results of the test are shown in the table depicted in FIG. 2. It was found that the flexibility of the strips was enhanced by glycerin at all relative humidity levels. It was also found that 0.45 g of glycerin per part was sufficient to impart extreme flexibility to the strips, even at only 15% relative humidity conditions. After the strips were treated with 0.45 g of glycerin per part, the strips were bent to the maximum allowable angle, 135°, without failure.

The moisture content increase due to the glycerin was apparently not the only factor causing an increase in the flexibility. Although the absorption of moisture at higher relative humidity levels due to glycerin further increased the flexibility of the strips, there was greatly enhanced flexibility even at very low relative humidity levels. It can therefore be concluded that the glycerin aids in improving the properties of the foam container in ways other than just by humidification. The glycerin apparently acts as a plasticizer or softener by its own right.

Additionally, the testing determined that problems associated with the viscosity of pure glycerin were avoided by utilizing an aqueous solution comprising 60% by weight of glycerin, as it was adequate for penetrating the pores of the skin of starch-based articles.

Example 2

The test apparatus depicted in FIG. 1 was utilized to compare the result of treating the inner surface or compression side with the outer surface or tension side of the strips having a starch-based matrix. The strips were sprayed at different levels of glycerin-water solution and allowed to equilibrate at approximately 40% relative humidity.

Figure 3:
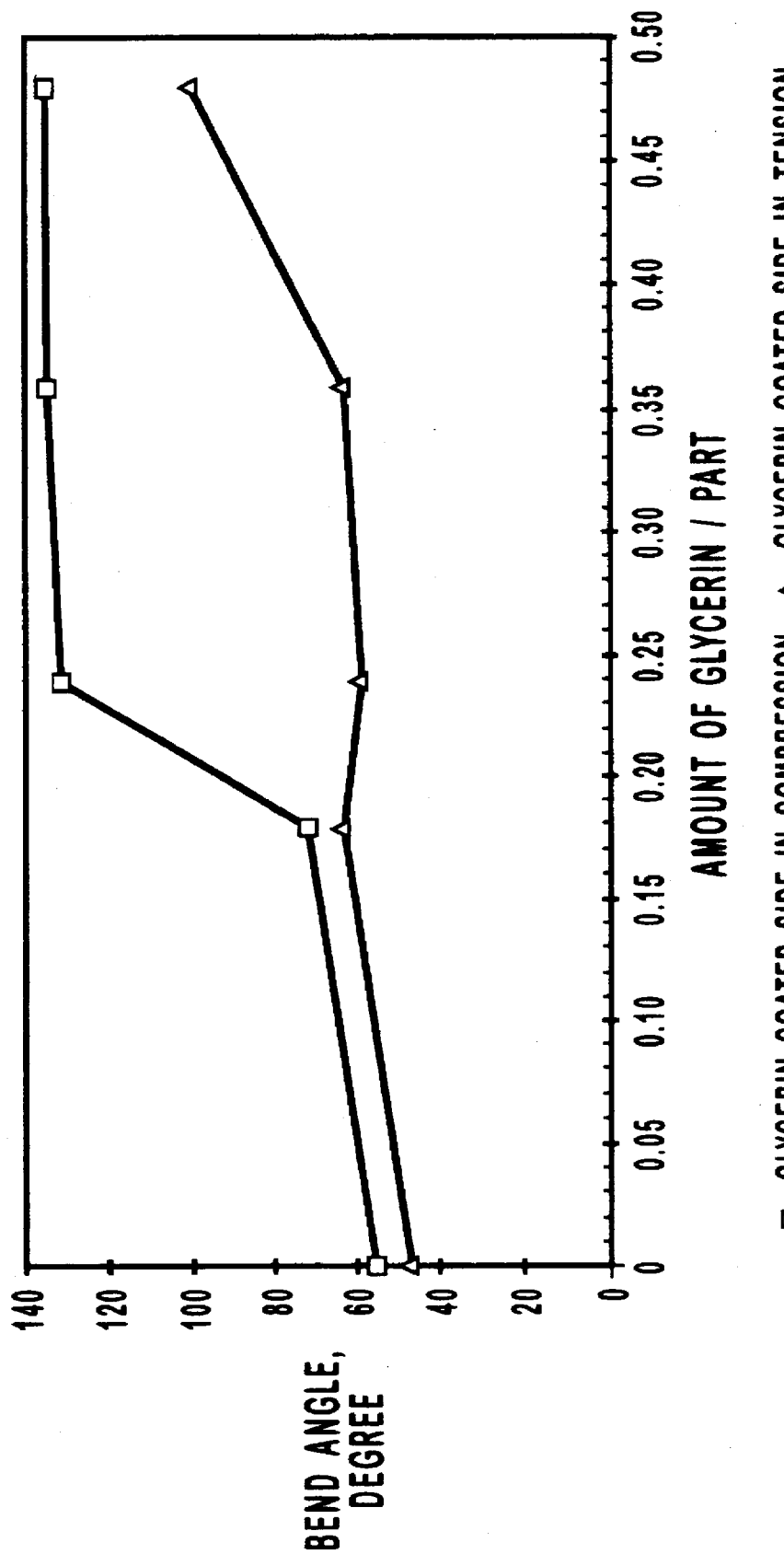
FIG. 3 is a graph comparing the effect of using varying amounts of glycerin on the compression side of a hinge verses the elongated side measured at 40% relative humidity.

The results of the testing are shown in the table depicted in FIG. 3. The flexibility of the ships treated on the inner surface greatly increased after being treated with more than about 0.2 g of glycerin per part as the ships were bent to the maximum allowable angle, 135°, without failure. The flexibility was not nearly as significantly improved for the same ships when the tension side was treated and then placed in tension. The bend angle for the ships treated on their tension side was only about 80°. It was also found that the dependence of flexibility on which surface was treated was most apparent for lower glycerin coating weights.

D. SUMMARY.

From the foregoing, it is learned that the present invention provides compositions and methods for improving the properties of starch-bound articles such that the articles have properties similar, or even superior, to paper, paperboard, metal, plastic, polystyrene, or other organic materials, thereby replacing the foregoing materials as the material of choice in the mass-production of containers and other articles.

The present invention further provides compositions and methods which allow for the manufacture of starch-bound containers and other articles without the need for prolonged, high-humidity conditioning in order to obtain the required flexibility, or toughness, or fracture energy.

Additionally, the present invention provides compositions and methods that allow for the manufacture of starch-bound containers and other articles without the need for adding humectants or plasticizers within the molding compositions in order to obtain the required flexibility, toughness, or fracture energy.

Further, the present invention provides compositions and methods that yield starch-bound containers and other articles having increased dimensional stability and resistance to warping when water-borne coatings or other surface treatments are applied.

Furthermore, the present invention to provides compositions and methods that make possible the manufacture of starch-bound containers and other articles at a cost that is comparable to, or even less than, existing methods for manufacturing containers or other articles from paper, paperboard, metal, plastic, polystyrene, or other organic materials.

The present invention also provides compositions and methods that yield containers and other articles having comparable critical mechanical properties for a specific use, such as, e.g., flexibility, strength, toughness, etc., compared to paper, paperboard, polystyrene, plastic or other organic materials.

In addition, the present invention provides compositions and methods for manufacturing starch-bound containers and other articles that include a substantial quantity of inorganic mineral filler without undue increase in stiffness and brittleness.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for treating a starch-based article comprising the steps of:
   providing a starch-based article which includes a quantity of a starch binder such that the starch-based article is dimensionally unstable when exposed to fluctuations in ambient moisture; and
   applying a liquid including a polyalcohol and a water-borne coating component to at least a portion of the starch-based article in order to treat the portion of the starch-based article, wherein the water-borne coating component is selected from the group consisting of polyvinyl alcohol, polylactic acid, natural latex, and mixtures thereof.

2. A method for treating a starch-based article as set forth in claim 1, wherein the polyalcohol is selected from the group consisting of polyethylene glycol, propylene glycol, polypropylene glycol, sorbitol, and mixtures thereof.

3. A method for treating a starch-based article as set forth in claim 1, wherein the polyalcohol comprises glycerin.

4. A method for treating a starch-based article as set forth in claim 1, wherein the liquid includes at least about 15% polyalcohol by weight of the liquid.

5. A method for treating a starch-based article as set forth in claim 1, wherein the liquid includes at least about 25% polyalcohol by weight of the liquid.

6. A method for treating a starch-based article as set forth in claim 1, wherein the liquid further includes an inorganic filler.

7. A method for treating a starch-based article as set forth in claim 1, wherein the liquid is preheated before being applied to the starch-based article.

8. A method for treating a starch-based article as set forth in claim 7, wherein the liquid is preheated to a temperature in a range from about 80° C. to about 90° C.

9. A method for treating a starch-based article as set forth in claim 1, wherein the starch-based article has a temperature greater than ambient temperature.

10. A method for treating a starch-based article as set forth in claim 9, wherein the starch-based article has a temperature in a range from about 80° C. to about 90° C.

11. A method for treating a starch-based article as set forth in claim 1, wherein the liquid is applied to the article in an amount such that the polyalcohol is applied in an amount in a range from about $1 \times 10^{-4}$ g/cm$^2$ to about $4.5 \times 10^{-4}$ g/cm$^2$ of the starch-based article.

12. A method for treating a starch-based article as set forth in claim 1, wherein the starch-based article has a starch-bound cellular matrix and wherein the polyalcohol penetrates a substantial depth into the starch-bound cellular matrix.

13. A method for treating a starch-based article comprising the steps of:
   providing a starch-based article having surfaces and a starch-bound cellular matrix; and
   applying a liquid including glycerin to at least a portion of the surfaces of the starch-based article to plasticize the portion of the surfaces of the starch-based article.

14. A method for treating a molded starch-bound cellular matrix comprising the steps of:
   providing the molded starch-bound cellular matrix; and
   applying a liquid including a polyalcohol to at least a portion of the molded starch-bound cellular matrix to plasticize the portion of the molded starch-bound cellular matrix, wherein the polyalcohol is selected from the group consisting of glycerin, polyethylene glycol, propylene glycol, ethylene glycol, sorbitol, and mixtures thereof.

15. A method for treating a molded starch-bound cellular matrix comprising the steps of:
   providing the molded starch-bound cellular matrix: and
   applying an aqueous solution including glycerin to at least a portion of the molded starch-bound cellular matrix to plasticize the portion of the molded starch-bound cellular matrix.

* * * * *

UNITED STATES PATENT AND TRADEMARK OFFICE
CERTIFICATE OF CORRECTION

PATENT NO. : 5,716,675
DATED : Feb. 10, 1998
INVENTOR(S) : Per Just Andersen; Simon K. Hodson It is certified that error appears in the above-identified patent and that said Letters Patent is hereby corrected as shown below:

Col. 10, line 23, after "sorghum," change "flee" to --rice--

Col. 14, line 30, after "may be" change "deskable" to --desirable--

Col. 16, line 31, after "reliable" delete "8"

Col. 17, line 55, after "The" change "post-fort-nation" to --post-formation--

Col. 20, line 58, after "of the" change "ships" to --strips--

Col. 20, line 60, after "as the" change "ships" to --strips--

Col. 20, line 64, after "for the" change "ships" to --strips--

Signed and Sealed this

Third Day of November, 1998

*Attest:*

BRUCE LEHMAN

*Attesting Officer*      *Commissioner of Patents and Trademarks*